US012485837B2

(12) United States Patent
Cekola et al.

(10) Patent No.: US 12,485,837 B2
(45) Date of Patent: Dec. 2, 2025

(54) COMBINATION OF TRAILER BRAKING AND LIGHTING FUNCTIONS

(71) Applicant: HORIZON GLOBAL AMERICAS INC., Plymouth, MI (US)

(72) Inventors: Nicholas Albert Cekola, Plymouth, MI (US); Dennis Michael Morse, Plymouth, MI (US); Marvin Hoot, Plymouth, MI (US); Yilong Chen, Plymouth, MI (US); Srikanth Kadudula, Plymouth, MI (US); Leon Bogdanov, Plymouth, MI (US); George Moore, Plymouth, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 766 days.

(21) Appl. No.: 17/745,589

(22) Filed: May 16, 2022

(65) Prior Publication Data

US 2022/0274547 A1    Sep. 1, 2022

Related U.S. Application Data

(63) Continuation of application No. 15/707,385, filed on Sep. 18, 2017, now abandoned.
(Continued)

(51) Int. Cl.
*B60R 16/023* (2006.01)
*B60Q 1/00* (2006.01)
(Continued)

(52) U.S. Cl.
CPC ........ *B60R 16/0231* (2013.01); *B60Q 1/0094* (2013.01); *B60Q 1/305* (2013.01);
(Continued)

(58) Field of Classification Search
CPC . B60R 16/0231; B60R 16/033; B60Q 1/0094; B60Q 1/305; B60Q 1/22;
(Continued)

(56) References Cited

U.S. PATENT DOCUMENTS 1,132,294 A    3/1915    Wilkie
2,228,631 A    1/1941    Kuiper
(Continued)

FOREIGN PATENT DOCUMENTS

CA    2157820    3/1996
CA    2201986    10/1997
(Continued)

OTHER PUBLICATIONS

International Searching Authority, European Patent Office, International Search Report for International App. No. PCT/US17/52036 mailed Jan. 15, 2018.
(Continued)

*Primary Examiner* — Christopher P Schwartz
(74) *Attorney, Agent, or Firm* — DAY PITNEY LLP; George N. Chaclas; Anthony A. Kassas (57) ABSTRACT

A towed vehicle controller combines a trailer brake controller and lighting driver. The towed vehicle controller can include a trailer battery charging circuit. The towed vehicle controller operates towed vehicle braking, towed vehicle lighting and towed vehicle battery charge functions.

20 Claims, 4 Drawing Sheets

Related U.S. Application Data (60) Provisional application No. 62/395,550, filed on Sep. 16, 2016.

(51) Int. Cl.

| | | |
|---|---|---|
| *B60Q 1/30* | (2006.01) | |
| *B60Q 1/44* | (2006.01) | |
| *B60R 16/033* | (2006.01) | |
| *B60T 7/20* | (2006.01) | |
| *B60T 13/66* | (2006.01) | |
| *B60T 17/22* | (2006.01) | |
| *B60Q 1/22* | (2006.01) | |
| *B60Q 1/34* | (2006.01) | |

(52) U.S. Cl.
CPC .............. *B60Q 1/44* (2013.01); *B60R 16/033* (2013.01); *B60T 7/20* (2013.01); *B60T 13/662* (2013.01); *B60T 17/22* (2013.01); *B60Q 1/22* (2013.01); *B60Q 1/34* (2013.01)

(58) Field of Classification Search
CPC .... B60Q 1/34; B60Q 1/44; B60T 7/20; B60T 13/662; B60T 17/22
USPC ................. 303/3, 7, 15, 20, 123; 701/70–72
See application file for complete search history.

(56) References Cited

U.S. PATENT DOCUMENTS

| | | |
|---|---|---|
| 2,870,276 A | 1/1959 | Gelzer |
| 3,015,958 A | 1/1962 | Dove |
| 3,023,626 A | 3/1962 | Bonnell |
| 3,053,348 A | 9/1962 | Stair |
| D199,904 S | 12/1964 | Nunn, Jr. |
| 3,183,512 A | 5/1965 | Castle |
| 3,276,270 A | 10/1966 | Speen |
| 3,354,725 A | 11/1967 | Canfield |
| D215,158 S | 9/1969 | Ozaki |
| 3,497,266 A | 2/1970 | Umpleby |
| 3,501,599 A | 3/1970 | Horecky |
| 3,503,652 A | 3/1970 | Broek |
| 3,519,805 A | 7/1970 | Throne-Booth |
| 3,569,788 A | 3/1971 | Niblack |
| 3,574,414 A | 4/1971 | Jacob |
| 3,598,453 A | 8/1971 | Riordan |
| 3,601,794 A | 8/1971 | Blomenkamp et al. |
| 3,704,670 A | 12/1972 | Dobson et al. |
| 3,710,629 A | 1/1973 | Wojtulewicz |
| 3,730,287 A | 5/1973 | Fletcher et al. |
| 3,738,710 A | 6/1973 | Pokrinchak et al. |
| 3,778,118 A | 12/1973 | Podlewski et al. |
| 3,780,832 A | 12/1973 | Marshall |
| 3,792,250 A | 2/1974 | Kilbourn et al. |
| 3,833,784 A | 9/1974 | Bobel et al. |
| 3,867,844 A | 2/1975 | Shimizu et al. |
| 3,897,979 A | 8/1975 | Vangalis et al. |
| 3,908,782 A | 9/1975 | Lang et al. |
| 3,909,075 A | 9/1975 | Pittet, Jr. et al. |
| 3,953,080 A | 4/1976 | Bremer |
| 3,953,084 A | 4/1976 | Pittet, Jr. et al. |
| 3,955,652 A | 5/1976 | Nilsson et al. |
| 3,964,796 A | 6/1976 | Bremer |
| 3,967,863 A | 7/1976 | Tomecek et al. |
| 3,981,542 A | 9/1976 | Abrams et al. |
| 3,981,544 A | 9/1976 | Tomecek et al. |
| 3,993,362 A | 11/1976 | Kamins et al. |
| 4,030,756 A | 6/1977 | Eden |
| 4,042,810 A | 8/1977 | Mosher |
| 4,043,608 A | 8/1977 | Bourg et al. |
| 4,050,550 A | 9/1977 | Grossner et al. |
| 4,061,407 A | 12/1977 | Snow |
| 4,072,381 A | 2/1978 | Burkhart et al. |
| 4,076,327 A | 2/1978 | Hubbard |
| 4,079,804 A | 3/1978 | Paillard |
| 4,084,859 A | 4/1978 | Bull et al. |
| 4,108,006 A | 8/1978 | Walter |
| 4,122,434 A | 10/1978 | Jensen |
| 4,128,745 A | 12/1978 | Marsilio et al. |
| 4,161,649 A | 7/1979 | Klos et al. |
| 4,196,936 A | 4/1980 | Snyder |
| D257,972 S | 1/1981 | Freehauf et al. |
| D257,973 S | 1/1981 | Reid |
| 4,277,895 A | 7/1981 | Wiklund |
| 4,295,687 A | 10/1981 | Becker et al. |
| 4,316,067 A | 2/1982 | Whiteman, Jr. |
| 4,336,592 A | 6/1982 | Beck |
| D266,501 S | 10/1982 | Stefanik |
| 4,386,427 A | 5/1983 | Hosaka |
| 4,398,252 A | 8/1983 | Frait |
| 4,402,047 A | 8/1983 | Newton et al. |
| 4,404,619 A | 9/1983 | Ferguson |
| 4,414,848 A | 11/1983 | Shutt |
| 4,419,654 A | 12/1983 | Funk |
| 4,445,376 A | 5/1984 | Merhav |
| D275,973 S | 10/1984 | Marino |
| 4,550,372 A | 10/1985 | Kahrs |
| 4,586,138 A | 4/1986 | Mullenhoff et al. |
| 4,587,655 A | 5/1986 | Hirao et al. |
| 4,624,506 A | 11/1986 | Doto |
| 4,660,418 A | 4/1987 | Greenwood et al. |
| 4,665,490 A | 5/1987 | Masaki et al. |
| 4,681,991 A | 7/1987 | Anderson |
| 4,721,344 A | 1/1988 | Frait et al. |
| 4,722,576 A | 2/1988 | Matsuda |
| 4,726,627 A | 2/1988 | Frait et al. |
| 4,768,840 A | 9/1988 | Sullivan et al. |
| 4,836,616 A | 6/1989 | Roper et al. |
| 4,845,464 A | 7/1989 | Drori et al. |
| 4,849,655 A | 7/1989 | Bennett |
| 4,850,656 A | 7/1989 | Ise et al. |
| 4,852,950 A | 8/1989 | Murakami |
| 4,856,850 A | 8/1989 | Aichele et al. |
| 4,872,099 A | 10/1989 | Kelley et al. |
| 4,905,518 A | 3/1990 | Kubler |
| 4,928,084 A | 5/1990 | Reiser |
| D308,666 S | 6/1990 | Oesterheld et al. |
| D315,216 S | 3/1991 | Kelley et al. |
| 5,002,343 A | 3/1991 | Brearley et al. |
| D316,399 S | 4/1991 | Wharton |
| 5,016,898 A | 5/1991 | Works et al. |
| 5,032,821 A | 7/1991 | Domanico et al. |
| D319,423 S | 8/1991 | Karczewski et al. |
| 5,039,173 A | 8/1991 | Emig et al. |
| 5,044,697 A | 9/1991 | Longyear et al. |
| 5,050,937 A | 9/1991 | Eccleston |
| 5,050,938 A | 9/1991 | Brearley et al. |
| 5,050,940 A | 9/1991 | Bedford et al. |
| 5,058,960 A | 10/1991 | Eccleston et al. |
| D322,426 S | 12/1991 | Austin |
| D323,136 S | 1/1992 | Chase et al. |
| 5,080,445 A | 1/1992 | Brearley et al. |
| D326,926 S | 6/1992 | Stephenson et al. |
| 5,139,315 A | 8/1992 | Walenty et al. |
| 5,142,473 A | 8/1992 | Davis |
| 5,149,176 A | 9/1992 | Eccleston |
| D331,226 S | 11/1992 | Austin |
| D334,733 S | 4/1993 | Morgan et al. |
| 5,226,700 A | 7/1993 | Dyer |
| 5,242,215 A | 9/1993 | Krause |
| 5,255,962 A | 10/1993 | Neuhaus et al. |
| 5,322,255 A | 6/1994 | Garrett |
| 5,333,948 A | 8/1994 | Austin et al. |
| D351,141 S | 10/1994 | Van Akkeren et al. |
| 5,352,028 A | 10/1994 | Eccleston |
| 5,355,717 A | 10/1994 | Tanaka et al. |
| 5,389,823 A | 2/1995 | Hopkins et al. |
| 5,398,901 A | 3/1995 | Brodmann et al. |
| 5,423,601 A | 6/1995 | Sigl |
| 5,446,657 A | 8/1995 | Ikeda et al. |
| D362,659 S | 9/1995 | Hedding et al. |
| D363,999 S | 11/1995 | Taylor et al. |
| D365,298 S | 12/1995 | Dixon |
| 5,487,305 A | 1/1996 | Ristic et al. |

(56) References Cited

U.S. PATENT DOCUMENTS

| | | |
|---|---|---|
| 5,487,598 A | 1/1996 | Rivard et al. |
| 5,498,910 A | 3/1996 | Hopkins et al. |
| D369,224 S | 4/1996 | Karlo et al. |
| 5,510,989 A | 4/1996 | Zabler et al. |
| D370,448 S | 6/1996 | McCoy et al. |
| 5,549,364 A | 8/1996 | Mayr-Frohlich et al. |
| 5,571,023 A | 11/1996 | Anthony |
| 5,575,543 A | 11/1996 | Pheonix |
| D376,437 S | 12/1996 | Karlo et al. |
| D376,576 S | 12/1996 | Pratt |
| 5,581,034 A | 12/1996 | Dao et al. |
| 5,587,865 A | 12/1996 | Bielig et al. |
| 5,606,308 A | 2/1997 | Pinkowski |
| D378,511 S | 3/1997 | Austin |
| 5,615,930 A | 4/1997 | McGrath et al. |
| 5,620,236 A | 4/1997 | McGrath et al. |
| 5,648,755 A | 7/1997 | Yagihashi |
| 5,649,749 A | 7/1997 | Kullmann et al. |
| D388,523 S | 12/1997 | Austin |
| 5,700,068 A | 12/1997 | Austin |
| 5,706,909 A | 1/1998 | Bevins et al. |
| 5,719,333 A | 2/1998 | Hosoi et al. |
| D392,604 S | 3/1998 | Wright et al. |
| 5,738,363 A | 4/1998 | Larkin |
| 5,741,048 A | 4/1998 | Eccleston |
| D394,626 S | 5/1998 | Sacco et al. |
| 5,775,712 A | 7/1998 | Link |
| 5,782,542 A | 7/1998 | McGrath et al. |
| 5,785,393 A | 7/1998 | McGrath et al. |
| 5,800,025 A | 9/1998 | McGrath et al. |
| D399,187 S | 10/1998 | Kay |
| 5,832,840 A | 11/1998 | Woof |
| D404,365 S | 1/1999 | Robertson et al. |
| 5,890,084 A | 3/1999 | Halasz et al. |
| D407,694 S | 4/1999 | Hill et al. |
| D408,773 S | 4/1999 | Blanchard |
| 5,893,575 A | 4/1999 | Larkin |
| D411,829 S | 7/1999 | Pancheri et al. |
| 5,949,147 A | 9/1999 | McGrath et al. |
| 5,951,122 A | 9/1999 | Murphy |
| D418,098 S | 12/1999 | Wallace |
| D418,822 S | 1/2000 | Worley et al. |
| 6,012,780 A | 1/2000 | Duvernay |
| 6,039,410 A | 3/2000 | Robertson et al. |
| 6,052,644 A | 4/2000 | Murakami et al. |
| 6,068,352 A | 5/2000 | Kulkarni et al. |
| 6,100,943 A | 8/2000 | Koide et al. |
| 6,122,568 A | 9/2000 | Madau et al. |
| 6,126,246 A | 10/2000 | Decker, Sr. et al. |
| 6,131,457 A | 10/2000 | Sato |
| D433,387 S | 11/2000 | Roth et al. |
| D434,011 S | 11/2000 | Roth et al. |
| D434,391 S | 11/2000 | Roth et al. |
| D434,392 S | 11/2000 | Reichard |
| D435,494 S | 12/2000 | Reichard |
| D436,932 S | 1/2001 | Roth et al. |
| 6,175,108 B1 | 1/2001 | Jones et al. |
| 6,177,865 B1 | 1/2001 | Bryant et al. |
| 6,179,390 B1 | 1/2001 | Guzorek et al. |
| 6,201,284 B1 | 3/2001 | Hirata et al. |
| 6,232,722 B1 | 5/2001 | Bryant et al. |
| 6,234,584 B1 | 5/2001 | Stumpe et al. |
| 6,263,733 B1 | 7/2001 | Reimer et al. |
| 6,273,522 B1 | 8/2001 | Feetenby et al. |
| 6,282,480 B1 | 8/2001 | Morse et al. |
| 6,286,911 B1 | 9/2001 | Wright et al. |
| 6,299,102 B2 | 10/2001 | Happ |
| 6,308,134 B1 | 10/2001 | Croyle et al. |
| D450,661 S | 11/2001 | Weisz et al. |
| D451,611 S | 12/2001 | Pontarolo |
| 6,325,466 B1 | 12/2001 | Robertson et al. |
| 6,364,432 B1 | 4/2002 | Mixon |
| 6,367,588 B1 | 4/2002 | Robertson et al. |
| 6,371,572 B1 | 4/2002 | Frank |
| 6,405,592 B1 | 6/2002 | Murari et al. |
| 6,419,055 B1 | 7/2002 | Walsh et al. |
| 6,445,993 B1 | 9/2002 | Eccleston et al. |
| 6,466,821 B1 | 10/2002 | Pianca et al. |
| 6,499,814 B1 | 12/2002 | Mixon |
| D468,273 S | 1/2003 | Reichard |
| D468,704 S | 1/2003 | Reichard |
| D468,705 S | 1/2003 | Reichard |
| 6,516,925 B1 | 2/2003 | Napier et al. |
| 6,520,528 B2 | 2/2003 | Fandrich et al. |
| 6,532,419 B1 | 3/2003 | Begin et al. |
| 6,557,952 B1 | 5/2003 | Robertson et al. |
| D477,553 S | 7/2003 | Brock et al. |
| 6,609,766 B1 | 8/2003 | Chesnut |
| 6,615,125 B2 | 9/2003 | Eccleston et al. |
| 6,619,759 B2 | 9/2003 | Bradsen et al. |
| 6,626,504 B2 | 9/2003 | Harner et al. |
| 6,634,466 B1 | 10/2003 | Brock et al. |
| 6,652,038 B1 | 11/2003 | Frye |
| 6,655,752 B2 | 12/2003 | Robertson et al. |
| 6,666,527 B2 | 12/2003 | Gill et al. |
| 6,668,225 B2 | 12/2003 | Oh et al. |
| 6,685,281 B2 | 2/2004 | MacGregor et al. |
| D488,370 S | 4/2004 | Sivertsen |
| D490,349 S | 5/2004 | Brock et al. |
| 6,752,474 B1 | 6/2004 | Olberding et al. |
| D494,547 S | 8/2004 | Smith et al. |
| 6,802,572 B2 | 10/2004 | Lamke et al. |
| 6,802,725 B2 | 10/2004 | Rowland et al. |
| D498,190 S | 11/2004 | Brock et al. |
| 6,837,551 B2 | 1/2005 | Robinson et al. |
| 6,845,851 B1 | 1/2005 | Donaldson et al. |
| 6,849,910 B2 | 2/2005 | Oberhardt et al. |
| 6,891,468 B2 | 5/2005 | Koenigsberg et al. |
| 6,918,466 B1 | 7/2005 | Decker, Jr. et al. |
| D509,959 S | 9/2005 | Nykoluk |
| 6,966,613 B2 | 11/2005 | Davis |
| D513,171 S | 12/2005 | Richardson |
| 7,021,723 B1 | 4/2006 | Kaufman |
| D522,041 S | 5/2006 | Sewell |
| D523,803 S | 6/2006 | Smith et al. |
| 7,058,499 B2 | 6/2006 | Kissel |
| D527,710 S | 9/2006 | Smith et al. |
| 7,168,531 B2 | 1/2007 | Navarro |
| 7,204,564 B2 | 4/2007 | Brown et al. |
| D542,745 S | 5/2007 | Barnes, Jr. et al. |
| D551,139 S | 9/2007 | Barnes et al. |
| 7,273,260 B2 | 9/2007 | Gray |
| 7,311,364 B2 | 12/2007 | Robertson |
| 7,347,507 B1 | 3/2008 | Stillinger |
| D581,356 S | 11/2008 | Ahlgren |
| D584,695 S | 1/2009 | Hilsbos et al. |
| D593,507 S | 6/2009 | Svoboda et al. |
| D598,395 S | 8/2009 | Hilsbos et al. |
| 7,575,286 B2 | 8/2009 | Robertson |
| D603,808 S | 11/2009 | Svoboda et al. |
| 7,746,219 B1 * | 6/2010 | Paul ............... B60Q 1/305 340/431 |
| D619,542 S | 7/2010 | Svoboda et al. |
| 8,145,402 B2 | 3/2012 | Craig |
| 8,165,768 B2 | 4/2012 | Leschuk et al. |
| 8,180,546 B2 | 5/2012 | Culbert et al. |
| 8,430,458 B2 | 4/2013 | Kaminski et al. |
| 8,442,797 B2 | 5/2013 | Kim et al. |
| 8,651,585 B2 | 2/2014 | Kaminski et al. |
| 8,700,285 B2 | 4/2014 | Barlsen et al. |
| 8,746,812 B2 | 6/2014 | Albright et al. |
| 8,789,896 B2 | 7/2014 | Albright et al. |
| 9,315,173 B1 | 4/2016 | Gray et al. |
| 9,352,684 B2 | 5/2016 | Barlsen et al. |
| 9,694,785 B1 | 7/2017 | Barrios et al. |
| 2001/0038239 A1 | 11/2001 | Ehrlich et al. |
| 2002/0003571 A1 | 1/2002 | Schofield et al. |
| 2002/0038974 A1 | 4/2002 | Lamke et al. |
| 2002/0047684 A1 | 4/2002 | Robertson et al. |
| 2002/0082750 A1 | 6/2002 | Lamke et al. |
| 2002/0095251 A1 | 7/2002 | Oh et al. |
| 2002/0123837 A1 | 9/2002 | Eccleston et al. |
| 2002/0180257 A1 | 12/2002 | Gill et al. |
| 2003/0025597 A1 | 2/2003 | Schofield |

(56) References Cited

U.S. PATENT DOCUMENTS

| | | |
|---|---|---|
| 2003/0038534 A1 | 2/2003 | Barnett |
| 2003/0042792 A1 | 3/2003 | Reinold et al. |
| 2003/0098610 A1 | 5/2003 | Bradsen et al. |
| 2003/0168908 A1 | 9/2003 | Robinson et al. |
| 2004/0026987 A1 | 2/2004 | Davis |
| 2004/0174141 A1 | 9/2004 | Luz et al. |
| 2004/0245849 A1 | 12/2004 | Kissel |
| 2005/0000739 A1 | 1/2005 | Leclerc |
| 2005/0006952 A1 | 1/2005 | Kohler et al. |
| 2005/0035652 A1 | 2/2005 | Roll et al. |
| 2005/0077780 A1 | 4/2005 | Robertson |
| 2005/0127747 A1 | 6/2005 | Robertson |
| 2006/0076827 A1 | 4/2006 | Albright et al. |
| 2006/0176166 A1 | 8/2006 | Smith et al. |
| 2006/0214506 A1 | 9/2006 | Albright et al. |
| 2006/0255921 A1 | 11/2006 | Ungerman |
| 2007/0024107 A1 | 2/2007 | Marsden et al. |
| 2007/0114836 A1 | 5/2007 | Kaminski et al. |
| 2007/0171031 A1 | 7/2007 | Hastings |
| 2007/0222283 A1 | 9/2007 | Skinner et al. |
| 2007/0241874 A1* | 10/2007 | Okpysh .......... B60Q 1/444 340/479 |
| 2008/0296968 A1 | 12/2008 | Culbert |
| 2008/0309156 A1 | 12/2008 | Kissel |
| 2010/0105227 A1* | 4/2010 | Vonnegut .......... H01R 13/6658 439/35 |
| 2010/0152920 A1 | 6/2010 | McCann |
| 2010/0152989 A1 | 6/2010 | Smith et al. |
| 2010/0222979 A1 | 9/2010 | Culbert et al. |
| 2011/0042154 A1 | 2/2011 | Bartel |
| 2012/0323443 A1 | 12/2012 | Risse et al. |
| 2013/0063026 A1 | 3/2013 | Stickley |
| 2014/0001730 A1 | 1/2014 | Kulkarni et al. |
| 2014/0103619 A1 | 4/2014 | Motts et al. |
| 2014/0172261 A1 | 6/2014 | Barlsen et al. |
| 2014/0246974 A1 | 9/2014 | Motts et al. |
| 2014/0247005 A1 | 9/2014 | Graham et al. |
| 2015/0066322 A1 | 3/2015 | Squire |
| 2015/0120141 A1 | 4/2015 | Lavoie et al. |
| 2015/0204741 A1 | 7/2015 | Hagan |
| 2015/0283982 A1 | 10/2015 | Diehl |
| 2016/0139003 A1 | 5/2016 | Posselius et al. |
| 2016/0318493 A1 | 11/2016 | Drako |
| 2017/0210371 A1* | 7/2017 | Fraser .......... B60T 17/22 |
| 2018/0079375 A1 | 3/2018 | Cekola et al. |
| 2019/0039578 A1 | 2/2019 | Sanchez et al. |
| 2019/0111899 A1 | 4/2019 | Lange, III et al. |
| 2019/0291593 A1 | 9/2019 | Healy et al. |

FOREIGN PATENT DOCUMENTS

| | | |
|---|---|---|
| CA | 2324091 | 4/2001 |
| CA | 109867 | 8/2006 |
| DE | 102005003261 | 8/2006 |
| EP | 0334412 | 9/1989 |
| GB | 1516052 | 6/1978 |
| WO | WO97/07003 | 2/1997 |

OTHER PUBLICATIONS

Motorola, Motorola Holster—SYN0718, http://commerce.motorola.com/cgi-bin/ncommerce3/ProductDisplay?prrfnbr=230044&prmenbr=126&accessories_cgrfnbr=22 . . . .

Service Manual 440-1002 for Carlisle Electric Brake Actuator Kit, Carlisle Industrial Brake and Friction, pp. 1-8.

Electronic Brake Control for 2, 4, 6 and 8 brake applications manual, 2007, Cequent Electrical Products, 9 pgs.

Hayes Lemmerz—Energize III—Brake Controller, http://aftermarket.hayes-lemmerz.com/html/energize_iii.html.

Hayes Lemmerz—Endeavor—Brake Controller, http://aftermarket.hayes-lemmerz.com/html/endeavor.html.

Hayes Lemmerz—Energize XPC—Brake Controller, http://.aftermarket.hayes-lemmerz.com/html/energize_xpc.html.

Dexter Axle—Predator DX2 Controller (058-008-00)—Brake Controller, http://www.dexteraxle.com/inc/pdetail?v=1&pid=1759.

Tekonsha—AccuPower AccuTrac Inertia Brake Control, 1 to 2 Axle Brake System, Model #80510, http://www.tekonsha.com/accuarac.html.

Tekonsha—AccuPower AccuPower DigiTrac II Inertia Brake Control, 1 to 4 Axle Brake Systems, Model #80750, http://www.tekonsha.com/digitrac.html.

Tekonsha—Voyager, Proporational Brake Control, 1 to 4 Axle Brake Systems, Model #9030, http://www.tekonsha.com/tevoyagerintro.html.

Sample of Applicant's products, http://www.hiddenhitch.com/Products/DisplayAccessory.asp?AccessoryID=39503; and 39510.

Sample of Applicant's products, http://www.hiddenhitch.com/Products/DisplayAccessory.asp?AccessoryID=39517; and 39514.

* cited by examiner

COMBINATION OF TRAILER BRAKING AND LIGHTING FUNCTIONS

CROSS-REFERENCE TO RELATED APPLICATION

This application is a continuation of U.S. Utility application Ser. No. 15/707,385, filed on Sep. 18, 2017 and entitled "COMBINATION OF TRAILER BRAKING AND LIGHTING FUNCTIONS" which claims the benefit of U.S. Provisional Patent Application Ser. No. 62/395,550, filed on Sep. 16, 2016 and entitled "COMBINATION OF TRAILER BRAKING AND LIGHTING FUNCTIONS," the entirety of which are incorporated herein by reference.

FIELD OF THE INVENTION

The present invention relates generally to brake controllers, and more specifically, to a system that combines functions of a brake controller and lighting module of a towed vehicle.

BACKGROUND OF THE INVENTION

A variety of prior art brake control units that provide a brake output signal to the brakes of a towed vehicle have been proposed and/or manufactured. One example of such a brake control unit is provided by U.S. Pat. No. 8,746,812, which is incorporated by reference in its entirety.

Most current brake control units are not integral with the towing vehicle. They are aftermarket units that are positioned in the towing vehicle in any available space. Moreover, lighting modules for and trailer battery charge functions are not integral with the towing vehicle. This results in multiple different components having to be integrated with or otherwise attached to a towing vehicle. Further still, these systems do not communicate with one another, take up additional space and often require significant time and effort to operatively attach.

Therefore, there is a need for a more efficient trailer brake controller that may incorporate towed vehicle braking control, towed vehicle lighting, and towed vehicle battery charge functions into a single unit.

SUMMARY OF THE INVENTION

Disclosed is a single towed vehicle controller that receives inputs (such as through discrete, analog, CAN and/or LIN) to determine braking of the towed vehicle, lighting of the towed vehicle, and towed vehicle battery charge functions. The towed vehicle controller may perform as a trailer brake controller, contain all possible combinations of lighting for a trailer, and operate as a trailer battery charger. The present disclosure describes a combination of a trailer brake controller, lighting module, and battery charger.

A towed vehicle controller is disclosed. The towed vehicle controller includes a processor comprising a memory device, a brake controller component coupled to the processor, and operatively generating a signal to be sent to trailer brakes, a trailer lighting component coupled to the processor and operatively comprising one or more light drivers that generate signals to control trailer lights and a trailer battery charge component coupled to the processor, and operatively generating a signal to be sent to a trailer battery.

A towed vehicle controller system is also disclosed. The towed vehicle controller system includes a communication bus of a towing vehicle, and a towed vehicle controller communicatively coupled to the communication bus. The towed vehicle controller includes a trailer brake control circuit that operatively and selectively generates a signal to induce braking in a towed vehicle's brakes, a lamp driver circuit that operatively and selectively drives lamps of a towed vehicle, and a trailer battery charging circuit that operatively and selectively controls charging of a towed vehicle battery. The communication bus provides input to the towed vehicle controller and the towed vehicle controller controls at least one of the trailer brake control circuit, the lamp driver circuit, and the trailer batter charging circuit based on the input.

A towed vehicle controller system including a communication bus of a towing vehicle and a towed vehicle controller communicatively coupled to the communication bus is also disclosed. The towed vehicle controller includes a trailer brake control circuit that operatively and selectively generates a signal to induce braking in a towed vehicle's brakes, a lamp driver circuit that operatively and selectively drives lamps of a towed vehicle, and a processor coupled to the trailer brake control circuit and lamp driver circuit, wherein the processor operatively controls the trailer brake control circuit and lamp driver circuit.

DESCRIPTION OF THE DRAWINGS

Objects and advantages together with the operation of the present teachings may be better understood by reference to the following detailed description taken in connection with the following illustrations, wherein.

DETAILED DESCRIPTION

Reference will now be made in detail to exemplary embodiments of the present teachings, examples of which are illustrated in the accompanying drawings. It is to be understood that other embodiments may be utilized and structural and functional changes may be made without departing from the respective scope of the present teachings. Moreover, features of the various embodiments may be combined or altered without departing from the scope of the present teachings. As such, the following description is presented by way of illustration only and should not limit in any way the various alternatives and modifications that may be made to the illustrated embodiments and still be within the spirit and scope of the present teachings.

As used herein, the words "example" and "exemplary" mean an instance, or illustration. The words "example" or "exemplary" or terms of similar import do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

"Logic" refers to any information and/or data that may be applied to direct the operation of a processor. Logic may be formed from instruction signals stored in a memory (e.g., a non-transitory memory). Software is one example of logic. In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer process running on a processor, a processor, a device, a process, a computer thread, or the like. In another aspect, such terms may include both an application running on a processor and a processor.

In an aspect, the towed vehicle controller may comprise a system that integrates a trailer brake controller, lighting module, and a trailer battery charger into a single unit. In some traditional systems, these different components are independent of each other. As such, each component had separate connections and took up its own physical space in a vehicle.

Disclosed is a towed vehicle control system that may include a single towed vehicle controller that receives inputs (such as through discrete, analog, CAN (Controller Area Network) and/or LIN (Local Interconnect Network)) to control braking of the towed vehicle (e.g., a trailer, such as an agriculture trailer, flat bed trailer, recreational trailer, or the like), lighting of the towed vehicle, and charging of the towed vehicle battery. The towed vehicle controller may include a trailer brake controller component that may include circuitry that operatively controls the brakes of a trailer, a trailer lighting component that may include circuitry to control various combinations of a trailer's lights, and a trailer battery charge component that may include circuitry to operatively control charging of a trailer's battery.

In described embodiments, the trailer brake controller component may be used with a towed vehicle, e.g., a trailer, to operatively control the brakes of the towed vehicle. The trailer brake control controller component may generate an output signal and may initiate transmission of the output signal to the brakes of the towed vehicle. The output signal may induce the brakes to apply a certain brake load thereto. The output signal may be related to a variety of input signals received by the brake controller from the towing vehicle, the towed vehicle, the operator, or any combination thereof. The towed vehicle controller may initiate transmission of signals that control the lights of the towed vehicle based at least in part on the output signal for the brakes of the towed vehicle. For instance, the towed vehicle controller may generate the output signal to the trailer brakes and generate a signal to the brake lights of the trailer to induce activation of the brake lights and brakes of the towed vehicle.

The towed vehicle controller may be an original equipment manufactured (OEM) unit that is installed in the towing vehicle at the factory. Alternatively or additionally, the towed vehicle controller may be incorporated into the towing vehicle as an after-market component. The towed vehicle controller may be combined in a single unit that operates the brakes of the towed vehicle, lights of the towed vehicle, and the battery of the towed vehicle. This may reduce the number of components utilized in the towing vehicle, which may make it easier, cost effective, and more efficient to install. Moreover, this may allow such system to be incorporated into the towing vehicle at the time of manufacture.

Figure 1:
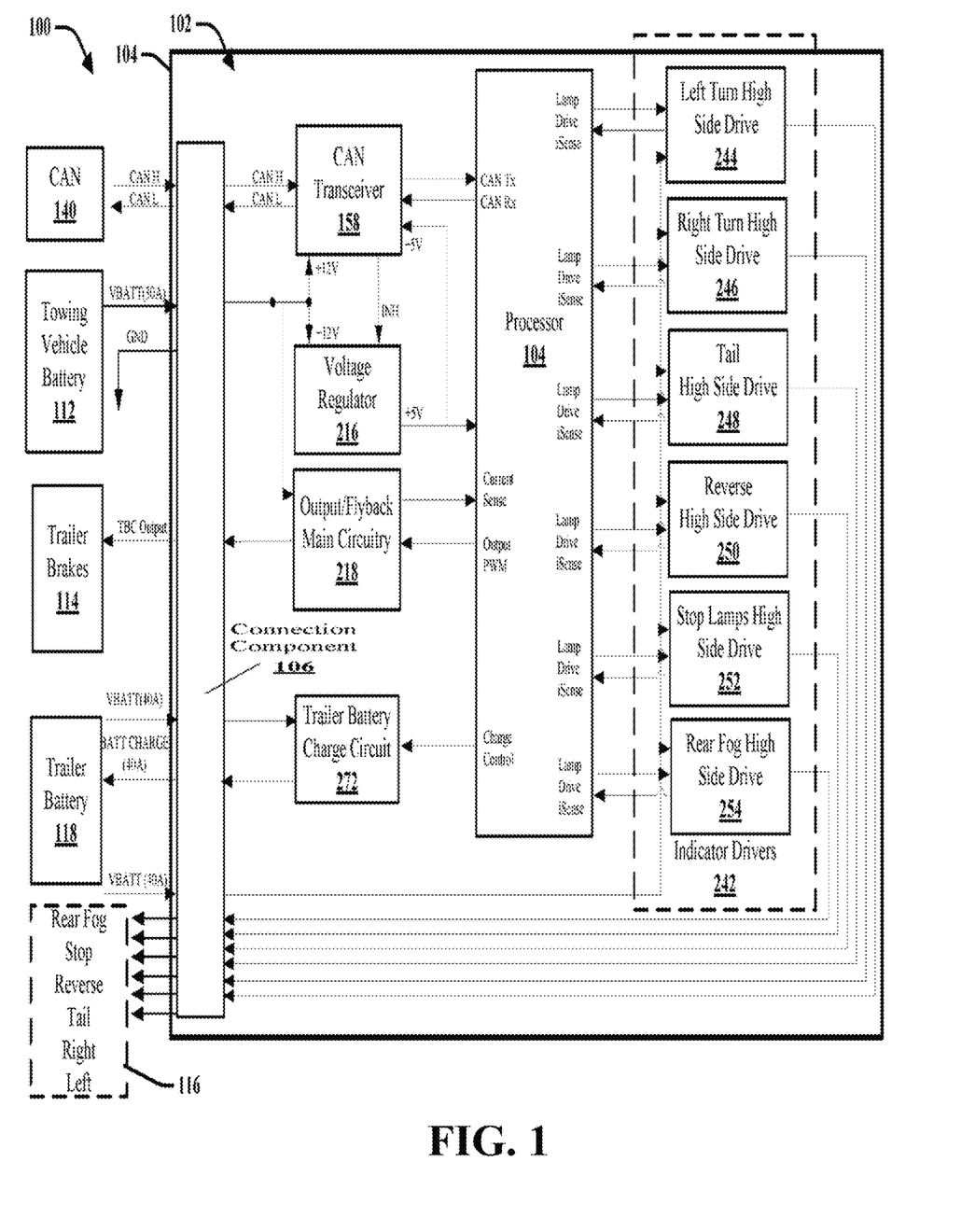
FIG. 1 is a block diagram of an exemplary embodiment of a towed vehicle controller comprising a trailer brake controller component, a trailer lighting component, and a trailer battery charge component.

The towed vehicle control system may include a towed vehicle controller and a communications network coupled to the towed vehicle controller. For instance, the towed vehicle control system may include a CAN bus (and/or discrete, analog and/or LIN connections) that is communicatively coupled to the towed vehicle controller and other components of the towing vehicle (e.g., ABS devices, sensors, displays, brake pedals, automatic braking by a vehicle, etc.). The towed vehicle controller may receive inputs over the CAN bus or the like to determine or control towed vehicle braking, towed vehicle lighting and towed vehicle battery charge functions. An exemplary embodiment of such system is shown in FIG. 1, which depicts a global module. The global module comprises various possible combinations of lighting for the towed vehicle, which may be any type of towed vehicle. In at least one embodiment, the global module may comprise all or generally all possible combinations of lighting for the towed vehicle. In at least some embodiments, the towed vehicle controller may comprise a depopulated version that includes sets or subsets of lighting that may be used to accommodate the needs for different global markets and/or different towed vehicles. For example, certain markets may not utilize or may prohibit activation of certain trailer lights. In these markets, the towed vehicle controller may include connections and/or circuitry for control of the appropriate lights.

More specifically as shown in FIG. 1, a towed vehicle control system 100 that primarily comprises a towed vehicle controller 102 is shown. The towed vehicle controller 102 may be generally housed in a single housing or enclosure 104. The housing or enclosure 104 may be integrated with the towing vehicle as an original equipment portion or may be added as an after-market component. The housing or enclosure 104 may be part of another housing or enclosure of the towing vehicle, such as a housing for other electrical components of the towing vehicle. Alternatively, a housing or enclosure 104 may not be utilized. For instance, the system may be directly and operatively connected with the towing vehicle without a housing for the electrical components. Further still, the housing or enclosure 104 may be operatively attached to the towing vehicle in any appropriate way, such as within a dash or control counsel.

The towed vehicle controller 102 may include a connection component 106. The connection component 106 is the conduit through which generally all input and output signals are sent to and from the towed vehicle controller 102 to the towing vehicle and/or towed vehicle. The connection component 106 may include one or more headers or electrical connectors. According to an embodiment, the connection component 106 may comprise a single electrical connector (e.g., a serial port) that comprises a plurality of electrical connectors operatively coupled together. As shown, the connection component 106 may operatively couple the towed vehicle controller 102 with a CAN 140 of the towing vehicle, the towing vehicle battery 112, trailer brakes 114, trailer lights 116, and a trailer battery 118. By way of a non-limiting example, the system 100 may receive and send signals via the CAN 140, which may comprise a high-speed CAN (HSCAN) or the like. The CAN 140 may comprise a vehicle's OEM CAN. In another aspect, the CAN 140 may comprise an aftermarket addition to a vehicle. It is noted that, as described here as well as elsewhere in this disclosure, the system 100 may utilize various other networks or communication systems within the towing vehicle other than or in addition to CAN 140. Embodiments, however, refer to CAN 140 for sake of brevity.

In at least some embodiments, the connection component 106 may be wiredly coupled with the towing vehicle. Further, in some embodiments the connection component 106 may be wirelessly coupled with the towing vehicle. For instance, the connection component 106 may comprise a wireless transceiver/receiver. In at least one aspect, the connection component 106 may comprise a combination of wired and wireless connection devices.

Figure 2:
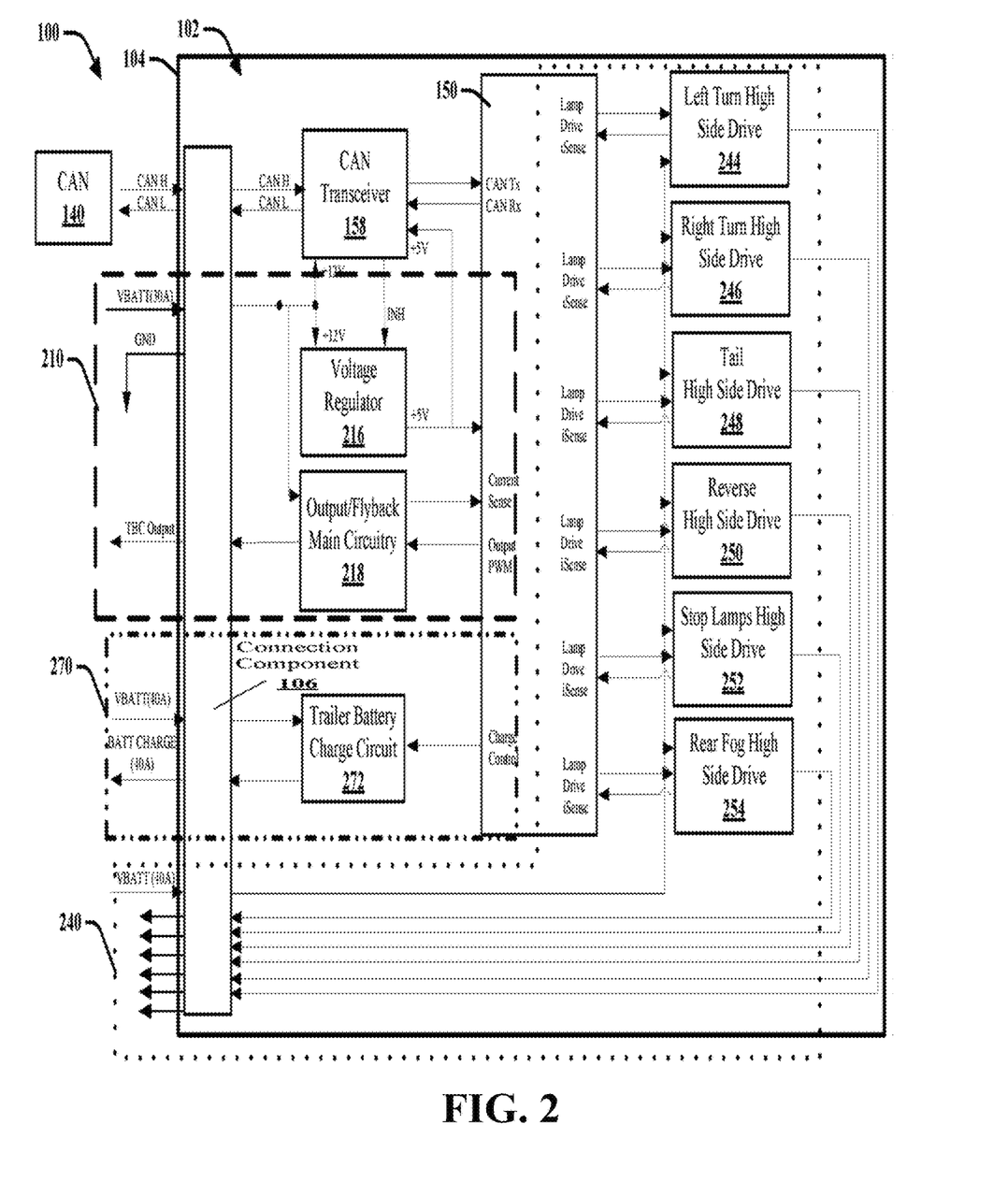
FIG. 2 is the block diagram of FIG. 1 identifying the towed vehicle controller comprising a trailer brake controller component, a trailer lighting component, and trailer battery charge component.

Turning to FIG. 2, with reference to FIG. 1, system 100 is annotated to illustrate circuitry that may comprise the trailer braking component 210, trailer lighting component 240, and trailer battery charge component 270. It is noted that the components 210, 240, and 270 may comprise appropriate electrical circuits. In another aspect, the components 210, 240, and 270 may comprise or communicate with a processor 150. The processor 150 may include a memory device that may be configured for storing computer executable components or instructions. Processor 150 may facilitate operation of the computer executable instructions. In an aspect, the instructions may control charging of the towed vehicle battery 118, brake application of the trailer brakes 114, lighting of the trailer lights 116, and/or user interface devices.

The processor 150 may be of any appropriate configuration. The processor 150 may operate as a processor or controller for various portions of the towed vehicle controller 102, e.g., the trailer braking component 210, trailer lighting component 240, and trailer battery charge component 270. As used herein, the term "processor" may include a general-purpose processor, a microcontroller (e.g., an execution unit with memory, etc., integrated within an integrated circuit), a digital signal processor (DSP), a programmable logic device (PLD), or an application specific integrated circuit (ASIC), among other processing devices. The processor 150 generally includes sufficient on-board memory to contain the software requirements to communicate with the towing vehicle's communication bus (such as the CAN 140), or other communication systems (such as a LIN and a J1850), in-vehicle diagnostics, and required functionality for interpreting vehicle and driver inputs. In some embodiments, the system 100 may include external memory coupled to the processor 150. In another aspect, the processor 150 may provide proper control to the: trailer brakes 114, trailer lights 116, trailer battery 118, and interfaces (e.g., dash displays that display information accessible to the operator). The processor 150 may be operably coupled (e.g., via the connector component 105) to a display driver, a manual control override, gain up/down controls, sensitivity controls, and the like.

The towed vehicle controller 102 may include a CAN transceiver 158. As noted above, embodiments may refer to a particular communications network for sake of brevity. Thus, while this disclosure may reference CAN transceiver 158, the towed vehicle controller 102 may include other input circuits that may operatively receive input from an appropriate network. For example, the towed vehicle controller 102 may include a wired or wireless transceiver operative for an appropriate communications protocol. It is noted that the towed vehicle controller 102 may extract data from the CAN 140 as well as transmit information to the CAN 140 to interface with other subsystems in the towing vehicle, e.g., cluster, ABS, vehicle stability systems, transmissions, dimming features, etc. The towed vehicle controller 102 is in constant communication with the CAN 140.

It is noted that the CAN transceiver 158 may be operatively coupled with the connection component 106 and the processor 150. The CAN transceiver 158 may receive and send input and output signals to the towing vehicle CAN 140 through the connection component 106. These input/outputs may operate the trailer brake controller component 210 trailer lighting component 240, and/or trailer battery charge component 270. Further, the CAN transceiver 158 may send and receive input and output signals to and from the processor 150 related to operation of the trailer brake controller component 210, trailer lighting component 240, and/or trailer battery charge component 270. These input and output signals may operate any one of the trailer brake controller component 210, trailer lighting component 240, trailer battery charge component 270, and/or user interfaces. In an example, the processor 150 may send output to CAN transceiver 158 that includes information regarding properties or parameters of related to the towed vehicle (e.g., connectivity status, brake application, light application, battery charging, etc.). The CAN transceiver 158 may generate output that is sent to the CAN 140 through the connection component 106. CAN 140 may deliver the information to appropriate devices within the towing vehicle. For instance, a towing vehicle may comprise a touch screen or LCD screen display that renders information to the use. The CAN 140 may provide information to the display (or a display controller that operatively controls the display) to cause the display to render the information for the user.

The brake controller component 210 may include a voltage regulator 216 of any appropriate configuration. The voltage regulator 216 may be operatively coupled with the towing vehicle battery 112 through the connection component 106 and operatively coupled with the processor 150 in any appropriate matter. Further, as shown in FIG. 1, the towed vehicle controller 102 may include an output/flyback main circuitry 218, which provides the trailer brake control output to the trailer brakes 114 through the connection component 106. The processor 150 may be operatively coupled with the output/flyback main circuitry 218 in any appropriate manner.

The output/flyback main circuitry 218 may operatively apply power from the towing vehicle battery 112 (or other power source) to the trailer brakes 114 in accordance with a brake control output from the processor 150. In another aspect, the output/flyback main circuitry 218 may provide feedback information to the processor 150 regarding the amount of current/voltage/power sent to the trailer brakes 114, connectivity status of the trailer brakes 114, short circuit identification, or the like. In an example, the output/flyback main circuitry 218 may include a current sensing circuit that senses the amount of current operatively sent to the trailer brakes 114. The processor 150 may compare the sensed current to the amount of current that should have been sent if the trailer brakes 114 were properly connect. This may allow the processor 150 to determine whether a short has occurred. In another aspect, the processor 150 may generate instructions that may be utilized to cause a display to render information related to the sensed current (e.g., indication of amount of braking, connectivity status, etc.).

The trailer battery charge component 270 may include a trailer battery charge circuit 272. The trailer battery charge circuit 272 may be operatively coupled between the connection component 106 and the processor 150 in any appropriate manner. The trailer battery charge circuit 272 may operate trailer battery charge functions. For instance, the processor 150 may receive inputs to identify when to charge a battery of the towed vehicle. This may include user provided inputs, measured levels of the towed vehicle battery, measure levels of the towing vehicle battery, demands on the towing vehicle battery and the like.

In an example, the trailer battery charge component 270 may operatively charge the towed vehicle battery through a charge control output sent from the processor 150 and received by the trailer battery charge circuit. The charge control output may induce charging of the towed vehicle battery. It is noted that the processor 150 may operatively charge the towed vehicle battery when demands on the towing vehicle battery are below a threshold or at non-peak demand times. For instance, when the towing vehicle is actively applying a signal to induce braking of the towed vehicle, the processor 150 may forgo charging. In another aspect, the processor 150 may provide information regarding the charging of the trailer battery 118 via the CAN 140 to other devices of the towing vehicle (e.g., such as a display).

In another aspect, the trailer light component 240 of the towed vehicle controller 102 may include one or more towed vehicle indicator drivers 242 that operatively drive appropriate trailer lights 116. For instance, the towed vehicle controller 102 may include a left turn indicator high side driver 244 (that may drive a left turn signal light or lamp of the towed vehicle), a right turn indicator side driver 246 (that may drive a right turn signal light or lamp of the towed vehicle), a tail indicator side driver 248 (that may drive a tail light or lamp of the towed vehicle), a reverse indicator side driver 250 (that may drive a reverse light or lamp of the towed vehicle), a stop indicator side driver 252 (that may drive a stop light or lamp of the towed vehicle), and a rear fog indicator side driver 254 (that may drive a rear fog light or lamp of the towed vehicle). It should be understood, however, that these are merely exemplary and the present disclosure is not limited to these. Any appropriate light driver and trailer lights 116 may be utilized without departing from the present teachings. Each of the light drives may be operatively coupled with the processor 150 to receive and/or send input and output signals to operate such applicable lights. The towed vehicle indicator drivers 242 may be operatively coupled with the connection component 106, the processor 150, and/or a power source (e.g., a towed/towing vehicle batter) in any appropriate manner.

The processor 150 may control or coordinate activation of the various trailer lights 116 based on inputs received from the CAN 140 and/or outputs calculated by the processor 150. For instance, the CAN 140 may communicate a user induced activation of a light (e.g., the user turns on a turn signal, places the vehicle in reverse, presses the hazard lights, etc.). The processor 150 may receive this information from the CAN 140 and may appropriately drive one or more of the towed vehicle indicator drivers 242. In another aspect, the processor 150 may active towed vehicle indicator drivers 242 based on application of the trailer brakes 114 via the trailer brake controller component 210 as described herein.

As described herein, the trailer brake controller component 210 may operatively control the trailer brakes 114. The trailer brake controller component 210 may be grounded as means of protection and safety. The trailer brake controller component 210 may be operatively coupled to the trailer battery 118 or other power supply. This may allow the trailer brake controller component 210 to selectively apply an appropriate amount of power to the trailer brakes 114.

It is noted that the trailer brake controller component 210 may operatively control the trailer brakes 114 based on various inputs as described herein. For instance, the trailer brake controller component 210 may operatively control the amount of braking induced in the trailer brake controller component 210 based on a predetermined pattern(s), a time-based pattern, user inputs, or the like, as described below. For instance, the trailer brake controller component 210 may control the brakes according to one or more algorithms or patterns stored in a memory of the processor 150. For instance, the trailer brake controller component 210 may operatively proportion the amount and time of braking induced by the trailer brake controller component 210 based on measured forces (e.g., inclination, acceleration, temperature, wheel speed sensors, ABS information, etc.).

As an example, the trailer brake controller component 210 can receive and send signals relating to wheel speeds of the towing (e.g., via the CAN 140) and/or towed vehicle, forces measured by sensors (e.g., accelerometers, gyroscopes, etc.), vehicle state information from ABS, brake-on-off, etc. The trailer brake controller component 210 can also receive signals from the brake pressure transducer (BPT) of the towing vehicle, and can also receive a power signal. In an aspect, the processor 150 may operatively receive the input(s) and generate a brake control output.

The brake control output may comprise one or more signals that may control the amount of braking induced in the trailer brakes 114. It is noted that the brake control output may comprise a pulse width modulated (PWM) signal or other appropriate signal. In at least one embodiment, the output/flyback main circuitry 218 may receive the brake control output and may, in turn, generate an appropriate brake output signal (e.g., the signal to be sent to the trailer brakes 114) via the connection component 106. For instance, the output/flyback main circuitry 218 may generate or vary the current and/or voltage of a signal to be sent to the trailer brakes 114 based on the brake control output received from the processor 150. The properties of the signal to be sent to the trailer brakes 114 may adjust the amount of braking induced at the trailer brakes 114.

As noted, the trailer brake controller component 210 may use a variety of preselected or continuously modified algorithms to generate the appropriate output to the towed vehicle brakes based on the received inputs. The processor 150 may receive the input signals from the source (such as the ABS system, a speed meter, the ignition, the brake pedal, other processors on the towing vehicle, etc.) and generates the appropriate output signal. The algorithms stored within the processor 150 may be updated by having new algorithms entered therein or having the existing algorithms modified automatically or manually. It should be noted that the towed vehicle controller 102 may be capable of being reprogrammed meaning that the algorithms stored therein can be modified by a technician or a completely new set of algorithms may be entered therein by a technician. This allows the towed vehicle controller 102 to be updated with new information regarding the towing vehicle, the towed vehicle, or the brake controller itself The algorithms stored in the towed vehicle controller 102 may correspond to each unique combination of inputs. The selection of the appropriate algorithm or algorithms is done by the processor once it receives the appropriate input information. Further, depending upon changes in the input(s), the processor may select a different algorithm or algorithms to generate the appropriate brake output signal. Of course, the processor 150 or a technician/operator may alter the algorithms stored to generate an appropriate brake output signal.

Additionally, the towed vehicle controller 102 may receive an input signal from the brake pressure transducer (BPT). The BPT input signal can be received via the CAN 140. This input signal represents the braking effort by the operator. The brake controller can also receive an input signal from the towing vehicle's anti-lock braking system (ABS) to adjust the application of the towed vehicle's brakes. In particular, the algorithm applies the ABS signal of the towing vehicle and responds to that signal by altering the brakes of the towed vehicle based on the ABS event. For example, the algorithm can cause the towed vehicle to continue to fully brake if the ABS is triggered due to wheel slip on a high μ surface, or can be used to reduce the braking to the towed vehicle if the ABS condition results from braking on a low or split μ surface.

It is noted that the processor 150 may determine the brake output control based on various identified inputs as described herein. In another aspect, the processor 150 may determine the brake output control based on inputs and user specified parameters. For instance, a user may identify and enter via user interfaces a selected predetermined algorithms, modifiable algorithms, or both. In particular, an operator can manually enter an input and the brake controller can output a brake output signal that can apply the brakes of the towed vehicle in a predetermined manner based on such input.

For instance, the towed vehicle controller 102 may comprise user interfaces that allow an operator to select a gain, sensitivity, manual braking intensity, maximum/minimum duty cycle (e.g., power output), or the like. The user interfaces may be coupled to the CAN 140 and/or may be wired or wirelessly coupled to the connection component 106.

Interfaces can provide several different inputs to the towed vehicle controller 102. For example, interfaces may include buttons that allow a user to turn features on/of (e.g., turn on/of brake controller features, lights, battery charging, etc.) In another aspect, user interfaces may include buttons that allow a user to change types of towed vehicle braking patterns (e.g., electric brake curves to electric over hydraulic algorithms). Since the load sensing and performance curves are significantly different for the two types of braking systems, this allows for adapting the towed vehicle controller 102 via the operator input to a unique algorithm(s) for electric over hydraulic brakes. Also, the display can show the use of the alternate configurations to notify the operator of the configuration currently set. For example, a flashing digital character representation or other visual indicator may show that the brake controller is interfacing to an electric over hydraulic braking system.

In another aspect, the towed vehicle controller 102 may adjust the maximum duty cycle available based on user input. More specifically, if manual activation occurs during a normal or ABS braking event, the greater of the two duty cycles, i.e., a normal ABS event or a limited operating strategy (LOS) deceleration braking event, is used. The determined duty cycle is then adjusted according to the current gain setting. The gain setting is used as a multiplier to the duty cycle. Therefore, it will produce an output that is scaled to a certain percentage of the current braking level the operator is requesting. For example, if the operator is requesting 75% desired braking capacity at a gain setting of 6.0, the brake controller will provide 45% of the maximum duty cycle available (60% times 75%).

According to another example, the trailer brake controller component 210 may adjust the brake control output based on a reference speed, inclination, or other sensed parameters associated with the towing or towed vehicle. For instance, the trailer brake controller component 210 may scale a gain adjusted duty cycle output according to the towing vehicle speed and/or inclination. At low speeds, a scaled percentage of the brake output control is computed based on a curve that is present in a lookup table present in the processor. This thereby causes reduced braking strength at lower speeds to prevent the brakes of the towed vehicle from jerking. At higher speeds, the brake output signal is set to 100% of calculated duty cycle. This duty cycle value is stored to be used for the output display on the towing vehicle display. The unadjusted value of this signal may be displayed, thereby, communicating to the operator the total level of braking requested at a specific gain setting.

In another example, the trailer brake controller component 210 may apply brakes based on a manual override control of the towed vehicle controller 102. For instance, the towing vehicle and/or towed vehicle controller 102 may comprise a user interface for a manual override of the towing vehicle brakes. The interfaces may comprise, for example, a manual slide having a linear travel potentiometer, controlled by the towing vehicle operator. It is noted that the manual control may be integrated with the towing vehicles control panel. The manual control may apply input to the trailer brake controller component 210 via, for instance, the CAN 140. This input to the trailer brake controller component 210 allows the operator to manually apply towed vehicle brakes without having to depress the brake pedal of the towing vehicle and/or to manual increase or decrease braking. The manual override control, moreover, may be utilized in conjunction with the gain adjustment buttons to calibrate maximum towed vehicle braking available based on specific towed vehicle loading, towed vehicle tire and brake conditions, and road conditions. Normal maximum is that braking force that is just short of causing the wheels of the towed vehicle to skid. When the operator activates the manual override control, the trailer brake controller component 210 sends a signal over the communication bus to the trailer brakes 114. Additionally, whenever there is a normal braking event for the towed vehicle, e.g., the operator depressing the brake pedal of the towing vehicle, a signal is also sent to the towing vehicle from the brake trailer brake controller component 210 via the communication bus.

The towed vehicle controller 102 may also be capable of: sending signals to the brakes of the towed vehicle; sending signals to the stoplight of the towed vehicle, including stoplight power; sending other signals to the towed vehicle; and sending signals to the towing vehicle. It is noted, however, that the processor 150 may control the trailer lighting component 240 independent of the trailer brake controller component 210. For instance, a towed vehicle may have lights but may not have its own brakes. As such, the processor 150 may control the lights of the towed vehicle independent of braking functions of the towed vehicle.

The trailer brake controller component 210 may also be capable of receiving information regarding the ignition of the towing vehicle. While specific embodiments of a trailer brake controller component 210 are disclosed these are exemplary and not exhaustive. Any brake controller configuration may be utilized with the present system.

As described herein, the towed vehicle controller 102 can be fully integrated with the towing vehicle. This allows the towed vehicle controller 102 to be originally installed equipment in a towing vehicle. In other words, the towed vehicle controller 102 can be a factory-installed option on a towing vehicle. In such circumstances, the displays and the controls for the towed vehicle controller 102 may be integrated into the instrument panel of the towing vehicle. As such, it is important that the controls operate similarly to the other controls contained in the towing vehicle's instrument panel. In particular, automatic dimming and light harmony with the dash lighting elements is important.

Accordingly, the towed vehicle controller 102 incorporates a mechanism via software and hardware interface to adjust the lighting intensity of the displays to coordinate with the intensity of the dash lighting elements of the towing vehicle. The adjustment of the towed vehicle controller 102 display is triggered through a message list being received via the towing vehicle communication bus (e.g., CAN 140). This adjustment is controlled through communication with the display driver and the display elements, such as by connection component 106 (e.g., which may comprise a serial bus or the like). Through a series of commands the functionality of the display, for example, dimming, blinking, setting element values, scrolling, etc., can be modified. For example, gain buttons or other user interfaces on the towed vehicle controller 102 are backlit to assist the operator in locating these adjustment devices. The intensity of the back lighting is also varied based on the operator's adjustment of the interior dash light adjustment of the towing vehicle.

It is further noted that the display and the intensity of the lights of the towed vehicle controller 102 may be automatically adjust via sensors or timers. For instance, a towed vehicle may include light sensors that operatively adjust the intensity of lights on a dash or control panel. The CAN 140 may send a control signal to the towed vehicle controller 102 indicating the desired intensity of the lights of the towed vehicle controller 102. The towed vehicle controller 102 may operatively adjust the lighting based on the received signal. It is noted, however, that the display lighting may be controlled by another device of the system 100, such as a controller external to the towed vehicle controller 102. By way of example, the display and intensity of the lights of the towed vehicle controller 102 may darken when the ambient light lowers such as night and may brighten in the day when the ambient light increases. The present teachings are not limited to such, the opposite may apply, i.e., the towed vehicle controller 102 display and light intensity may increase when the ambient light decreases and may decrease when the ambient light increases.

Figure 3:
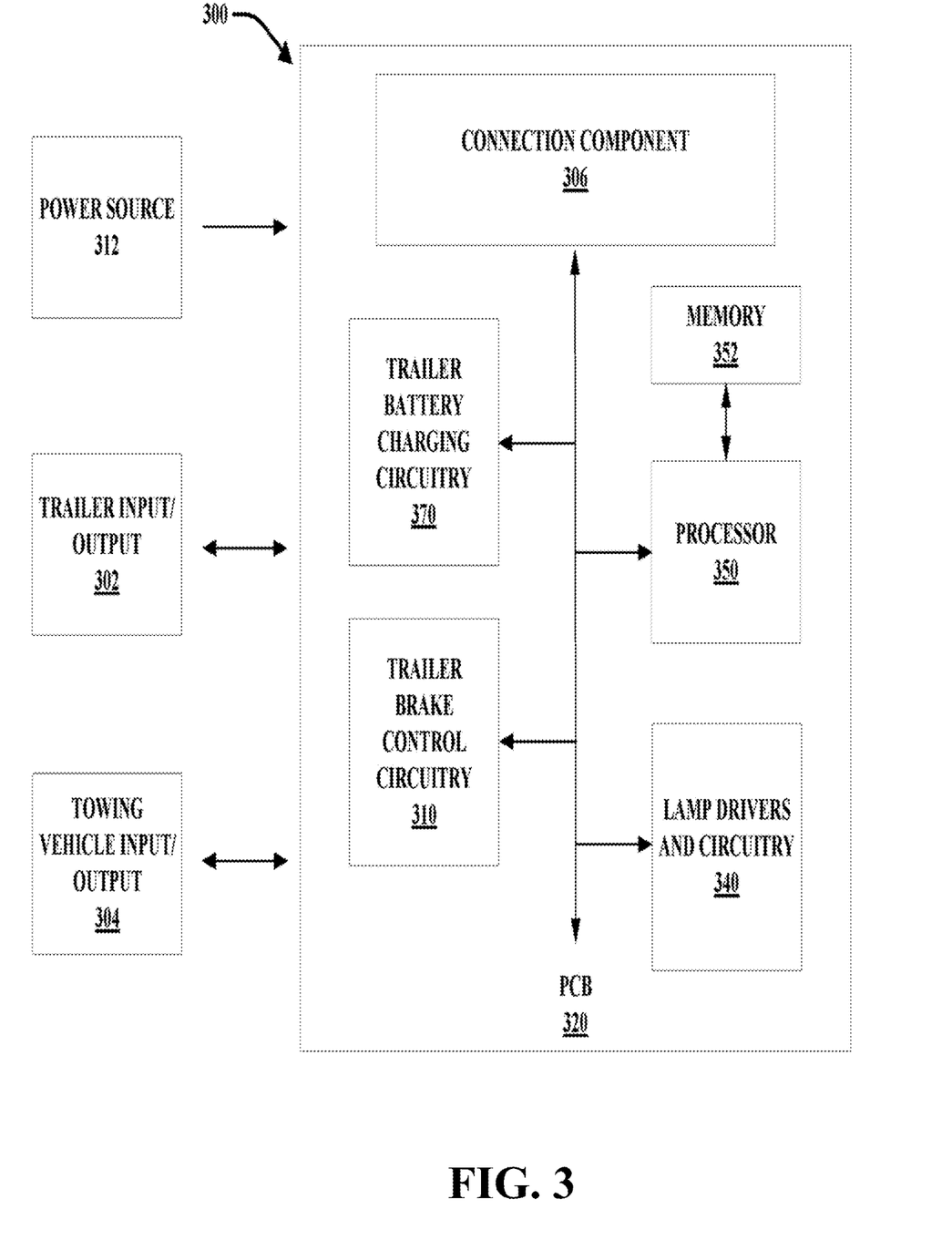
FIG. 3 is a plan view of circuitry of the combination trailer brake controller and lighting module device.

Turning to FIG. 3, there is an exemplary block schematic of a towed vehicle controller 300. It is noted that the towed vehicle controller 300 may comprise similar or different aspects as described with reference to towed vehicle controller 102 of FIGS. 1-2. The towed vehicle controller 300 primarily comprises a printed circuit board (PCB) 320, a connection component 306 (e.g., which may comprise aspects of connection component 106), trailer brake control circuitry (e.g., which may comprise aspects of brake controller component 210), lamp drivers and circuitry 340 (e.g., which may comprise aspects of trailer lighting component 240), trailer battery control circuitry 310 (e.g., which may comprise aspects of trailer battery charge component 270), and a processor 350 coupled to memory 352. While the various circuits and components of towed vehicle controller 300 are shown as mounted or coupled to a single PCB 320, it is noted that the various circuits and components of towed vehicle controller 300 may be mounted on separate PCBs that, in-turn, are couple together. Moreover, the towed vehicle controller 300 may comprise various other circuits or components in accordance with this disclosure.

It is noted that the towed vehicle controller 300 may be in communication with a power source 312 to provide power to the circuitry and a towed vehicle. For instance, the towed vehicle controller 300 may operatively provide power to a trailer via trailer input/output 302.

The towed vehicle controller 300 operatively communicates with the towing vehicle via towing vehicle input/output 304 and the towed vehicle via trailer input/output 302. In embodiments, all towing vehicle input/output 304 and signals may pass through connection component 306. In another aspect, the connection component 306 may comprise a connector for a network bus, such as a CAN bus.

Figure 4:
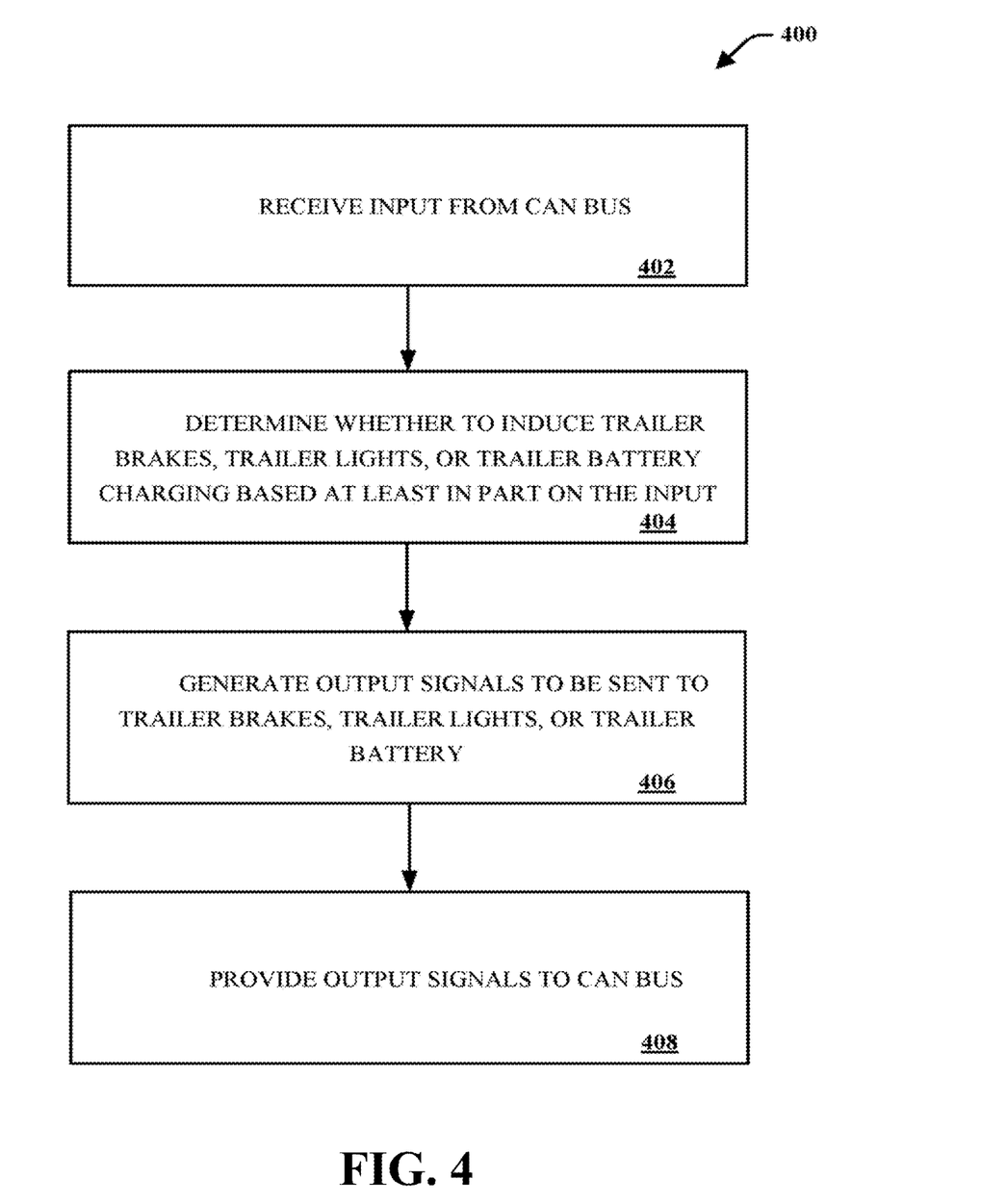
FIG. 4 is an exemplary method for controlling the trailer brakes, trailer lights, and trailer battery of a towed vehicle.

In view of the subject matter described herein, methods that may be related to various embodiments may be better appreciated with reference to the flowchart of FIG. 4. While the method 400 is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more users, mechanical machines, automated assembly machines (e.g., including one or more processors or computing devices), or the like.

At 402, a system (e.g., towed vehicle control system 100) may receive input from CAN bus. For instance, a towed vehicle controller may receive input via a communication component. The input may relate to user actions (e.g., brake application, turn signal activation, gain/sensitivity adjustments), sensed parameters from a towing vehicle (e.g., ABS sensors, wheel speed sensors, light sensors, etc.), or the like.

At 404, the system may determine whether to induce trailer brakes, trailer lights, or trailer battery charging based at least in part on the input. As described herein, a towed vehicle controller may determine whether to apply brakes of a trailer, activate trailer lights, and/or activate/disable charging of a trailer battery.

At 406, the system may generate output signals to be sent to trailer brakes, trailer lights, or trailer battery. The output signal may be of an appropriate form and may carry information. In an aspect, the system may output signals that induce an amount of braking, lights to activate and/or a battery to charge.

At 408, the system may provide output signals to a CAN bus. For instance, the system may receive feedback information regarding diagnostics, status, brake application, light actuation, battery charging, or the like. The system may processes the information and may generate an appropriate output, such as output to control a display.

It should be understood that the foregoing description is a description of an exemplary brake controller. The present teachings are not limited to the embodiment disclosed above. Any configuration of brake controller may be utilized without departing from the present teachings.

Modification of the invention will occur to those skilled in the art and to those who make or use the invention, including, without limitation, the values provided for the various elements disclosed above. It should be understood that such values are exemplary values and the present invention is not limited to those values. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define a blending system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. A towed vehicle controller with combined trailer brake lighting control, comprising:
   a processor communicatively coupled with a towing vehicle over a communication bus; and
   a communication bus coupled to the processor;
   wherein the processor generates a braking signal configured to be sent to a trailer;
   wherein the processor generates a lighting signal to operate all of a left turn light, a right turn light, a reverse light, a stop light, and a tail light on the trailer that is independent of the braking signal and wherein the lighting signal is provided by the towing vehicle over the communication bus from a controller area network (CAN) of the towing vehicle.

2. The towed vehicle controller of claim 1, further comprising a user interface, wherein the user interface provides manual input to the left turn light, the right turn light, the reverse light, the stop light and the tail light.

3. The towed vehicle controller of claim 2, wherein the user interface comprises a display with a light that provides diagnostic information regarding operation of the left turn light, the right turn light, the reverse light, the stop light and the tail light.

4. The towed vehicle controller of claim 3, wherein the user interface comprises a light intensity interface that coordinates an intensity of the light of the user interface with a light of a towing vehicle.

5. The towed vehicle controller of claim 4, wherein the processor coordinates activation of the left turn light, the right turn light, the reverse light, the fog light and the tail light of the trailer.

6. The towed vehicle controller of claim 2, wherein the communication bus communicates to the user interface a connectivity status determined from a signal sent from brakes of the trailer and signals sent from the left turn light, the right turn light, the reverse light, the stop light and the tail light.

7. The towed vehicle controller of claim 6, wherein the connectivity status is checked when the left turn light, the right turn light, the reverse light, the stop light and the tail light are not active.

8. The towed vehicle controller of claim 2, wherein activation of the manual input sends a drive signal to control the stop light and the drive signal is not sent via a communications bus of a towing vehicle.

9. The towed vehicle controller of claim 1, wherein the processor generates a lighting signal to operate a fog light of the trailer.

10. A towed vehicle controller comprising:
   a) a CAN transceiver;
   b) a processor, in electrical communication with the CAN transceiver and configured to:
      receive differential CAN signals from the CAN transceiver, the differential CAN signals being indicative of instructions from a towing vehicle;
      process the differential CAN signals to determine a braking response or a vehicle indicator response;
      generate a vehicle indicator response control signal based on the vehicle indicator response;
      generate a braking response control signal, independent of the vehicle indicator response control signal, based on the determined braking control response;
   c) an output main circuit, operatively connected to the processor and a trailer brake system, the output main circuit configured to:
      receive the braking response control signal from the processor;
      modulate electrical power supplied to the trailer brake system based on the braking response control signal; and
   d) at least one indicator driver, operatively connected to the processor and at least one trailer light, the at least one indicator driver configured to:
      receive the vehicle indicator response control signal from the processor; and
      modulate electrical power supplied to the at least one trailer light based on the vehicle indicator response control signal.

11. The towed vehicle controller of claim 10, wherein the processor is further configured to process the received converted differential CAN signals to determine a trailer battery vehicle charge response, and output a trailer battery vehicle charge control signal, independent of both the braking response control signal and the vehicle indicator response control signal.

12. The towed vehicle controller of claim 11, further comprising a trailer battery charge circuit operatively connected to the processor and a trailer battery, the trailer battery charge circuit configured to:
   receive the trailer battery vehicle charge control signal from the processor; and
   modulate electrical power supplied to the trailer battery based on the trailer battery vehicle charge control signal.

13. The towed vehicle controller of claim 10, further comprising a current sense feedback loop operatively connected to the output main circuit and the processor, the current sense loop configured to:
   measure an electrical current delivered to the trailer brake system via the modulated electrical power supplied to the trailer brake system;
   generate a current sense feedback signal; and
   transmit the current sense feedback signal to the processor;
   wherein the processor is further configured to receive the current sense feedback signal and dynamically adjust the braking response control signal based on the current sense feedback signal to regulate a braking force applied to the trailer brake system, enabling real-time adjustment of braking force.

14. The towed vehicle controller of claim 10, further comprising a current sense feedback loop operatively connected to the at least one indicator driver and the processor, the current sense feedback loop configured to:
  measure an electrical current delivered to the at least one trailer light via the modulated electrical power supplied by the at least one indicator driver;
  generate a current sense feedback signal; and
  transmit the current sense feedback signal to the processor;
  wherein the processor is further configured to receive the current sense feedback signal and evaluate the signal to detect one or more fault conditions associated with the at least one trailer light, enabling real-time monitoring and fault detection of the trailer lighting system.

15. A towed vehicle controller for a towing and towed vehicle configuration, the towed vehicle controller comprising:
  a processor configured to send and receive data from a controller area network (CAN) transceiver, the processor configured to receive braking or vehicle indicator commands from a towing vehicle CAN;
  an output main circuit in operative communication with the processor and CAN transceiver, the output main circuit configured to produce braking control signals based on the braking commands received from the processor;
  a plurality of indicator drivers in operative communication with the processor and CAN transceiver, the plurality of indicator drivers configured to produce vehicle indicator control signals based on the vehicle indicator commands received from the processor;
  an electrical connector operatively connected to the CAN transceiver and output main circuit, the electrical connector configured to output:
    a time base correction electrical power to brake units of the towed vehicle based on the braking control signals received from the output main circuit; and
    electrical power to the trailer lights of the towed vehicle based on the vehicle indicator control signals received from the plurality of indicator drivers.

16. The towed vehicle controller of claim 15, wherein the processor is further configured to receive trailer battery vehicle charge commands from the towing vehicle CAN.

17. The towed vehicle controller of claim 16, further comprising a trailer battery charge circuit in operative communication with the processor and CAN transceiver, the trailer battery charge circuit configured to produce trailer battery vehicle charge control signals based on the battery vehicle charge commands received from the processor.

18. The towed vehicle controller of claim 17, wherein the electrical connector is configured to output electrical power to the trailer battery of the towed vehicle based on the trailer battery vehicle charge control signals received from the trailer battery charge circuit.

19. The towed vehicle controller of claim 15, further comprising a current sense feedback loop operatively connected to the output main circuit and the processor, the current sense loop configured to:
  measure an electrical current delivered to the brake units;
  generate a current sense feedback signal; and
  transmit the current sense feedback signal to the processor;
  wherein the processor is further configured to receive the current sense feedback signal and dynamically adjust the braking control signals based on the current sense feedback signal to regulate a braking force applied to the brake units, enabling real-time adjustment of braking force.

20. The towed vehicle controller of claim 15, further comprising a current sense feedback loop operatively connected to the plurality of indicator drivers and the processor, the current sense feedback loop configured to:
  measure an electrical current delivered to the trailer lights;
  generate a current sense feedback signal; and
  transmit the current sense feedback signal to the processor;
  wherein the processor is further configured to receive the current sense feedback signal and evaluate the signal to detect one or more fault conditions associated with trailer lights, enabling real-time monitoring and fault detection of the trailer lights.

* * * * *